United States Patent [19]

Persson et al.

[11] 4,303,328

[45] Dec. 1, 1981

[54] DEVICE FOR PHOTOGRAPHIC CAMERAS WITH FOCAL PLANE SHUTTER

[75] Inventors: Kjell-Anders Persson, Skene; Lennart Stålfors, Hindås, both of Sweden

[73] Assignee: Victor Hasselblad Aktiebolag, Gothenburg, Sweden

[21] Appl. No.: 118,306

[22] Filed: Feb. 4, 1980

[30] Foreign Application Priority Data

Jul. 2, 1979 [SE] Sweden .............................. 7905760

[51] Int. Cl.³ ...................... G03B 17/02; G03B 17/26
[52] U.S. Cl. .................................... 354/288; 354/281
[58] Field of Search ................... 354/48, 49, 202, 281, 354/241–243, 275, 276, 288

[56] References Cited

U.S. PATENT DOCUMENTS

| | | | |
|---|---|---|---|
| 3,491,671 | 1/1970 | Engeldrum | 354/288 |
| 3,724,352 | 4/1973 | Shimomura | 354/281 |
| 4,017,877 | 4/1977 | Powers | 354/281 X |

FOREIGN PATENT DOCUMENTS

| | | | |
|---|---|---|---|
| 255723 | 7/1948 | Switzerland | 354/275 |
| 440081 | 12/1935 | United Kingdom | 354/275 |

*Primary Examiner*—Donald A. Griffin
*Attorney, Agent, or Firm*—Sherman & Shalloway

[57] ABSTRACT

Figure 2:
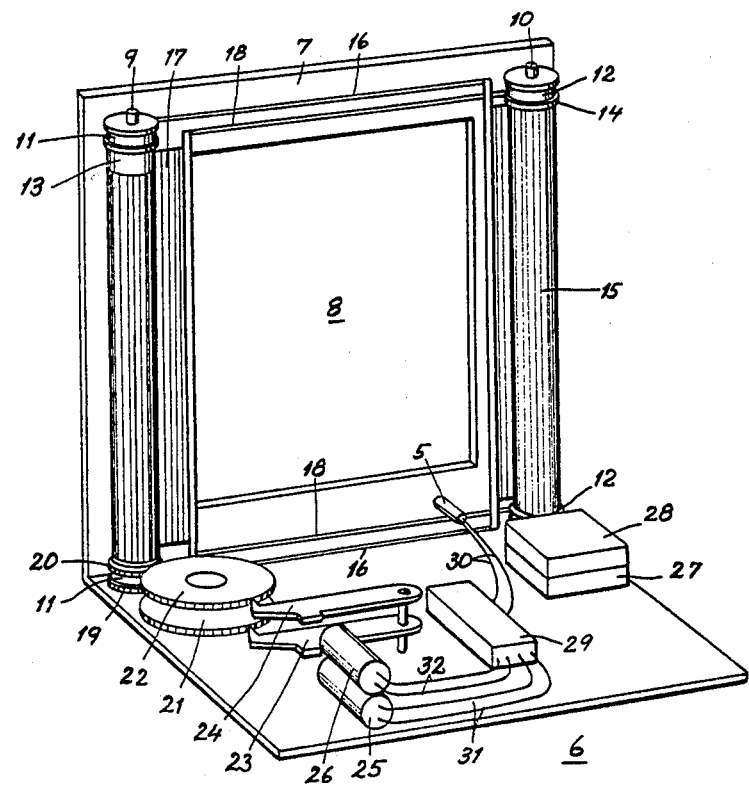

The invention relates to an automatic device for protecting the focal plane shutter of a camera when the camera is open. The film magazine of the camera, alternatively the camera back, is sensed by a member disposed in the camera body and directly or preferably indirectly controlling the shutter electronically. When the camera is opened, the sensing member emits a control pulse, which releases the opening part of the shutter. The opening and closing parts of the shutter then are located on both sides of the film gate of the camera where they are protected against damage. When the camera again is closed, the opening part of the shutter again must be cocked. Alternatively, also the closing part of the shutter can be released by a control pulse released when the camera is being closed. The protective device is lockable. (FIG. 2).

10 Claims, 6 Drawing Figures

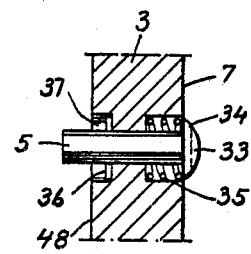
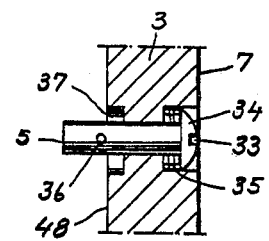
Fig.3  Fig.4
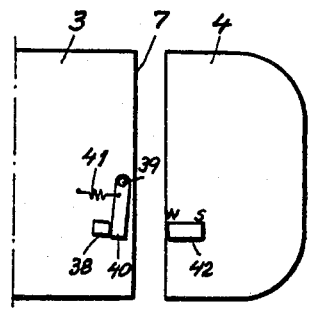
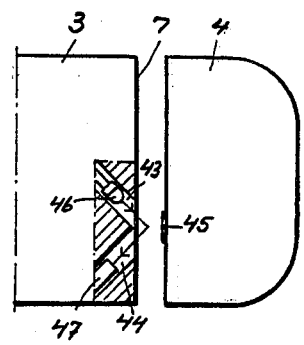
Fig.5  Fig.6

DEVICE FOR PHOTOGRAPHIC CAMERAS WITH FOCAL PLANE SHUTTER

This invention relates to a device photographic cameras with focal plane shutters as referred to in the preamble of the attached claim 1.

In photographic cameras with focal plane shutters, the shutter is disposed in a film gate located in front of the film plane of the camera. When the shutter is cocked, the gate is covered by the opening part of the shutter, and when the shuter is released, the gate is covered by the closing part of the shutter. Upon exposure by the shutter, the edges of the opening and closing parts facing towad each other form a gap, which moves past the gate. The gate, thus, is covered by the shutter both in cocked and released state thereof. When the camera is opened for film exchange or for some other reason, the shutter assumes a very exposed position in front of the gate located on the back of the camera. The opening and, respectively, closing parts covering the gate may consist of plane, rigid plates or of flexible curtains of fabric, rubber or metal. The said parts, irrespective of their type and material, are constructed with least possible mass so as to be capable at exposure to very rapidly be accelerated and retarded to and, respectively, from constant speed through the short distances available. Owing to the low mass, said parts easily deform. The exposed position in combination with the tendency of easy deformation implies that the focal plane shutter often is damaged when film exchange takes place, because in connection therewith the shutter is touched unintentionally, or when the camera is placed with its shutter facing donward on an uneven support. Even a scarcely visible deformation is sufficient to give rise to serious misfunctioning of the shutter. Roller-blind shutters are particularly sensistive in this respect when they have folded metal curtains intended for so-called intermediate size cameras with picture size 6×6 cm or greater.

The present invention has the object to prevent damages of the focal plane shutter at opened camera by providing the camera with an automatic protective device, which with cocked shutter exposes the film gate of the camera when the camera is opened by removing its film magazine or its back or by folding the back in lateral direction.

A further object of the invention is to provide the aforesaid protective device with a locking means, by which the protective device can be rendered inoperative when there is not sufficient time to permit the extra cocking of the shutter required by the protective device after film exchange, for example in the case of rush photographic journalism.

Still another object of the present invention is so to design the protective device, that it is simple, reliable and applicable to focal plane shutter cameras of different types.

These objects are achieved according to the present invention by carrying out the measures defined in the characterizing clause of the main claim.

According to the invention, thus, a member for alternatively sensing the film magazine of the camera or the camera back is provided in the camera body portion facing to the film magazine and, respectively, camera back. Said member is coupled directly or indirectly to the focal plane shutter for releasing the opening part thereof when the film magazine is being removed, alternatively when the camera back is opened or removed.

The said sensing member is capable so to control the focal plane shutter, that it is released automatically in two steps upon the opening and closing of the camera. In a first step, the opening part of the focal plane shutter is released and the gate is exposed when the camera is opened by removing the film magazine or alternatively the camera back from the sensing member in the camera body. When the camera is open, for example for film exchange, the opening and closing parts of the focal plane shutter, thus, are concealed each on one side of the gate and thereby are protected in desired manner against being touched unintentionally. In a second step, the closing part of the focal plane shutter is released and covers the gate when the sensing member again assumes contact with the film magazine, alternatively with the camera back when the camera is being closed. The shutter thereby is fully released, and for the next exposure an extra cocking is required.

According to an alternative solution of the object of the invention, the device is designed so that only the opening part of the shutter is actuated by the sensing member, and only the first one of the two steps, implying the release of the opening shutter part, is carried out when the camera is opened. When the camera is closed, only the opening part of the shutter must be returned to the starting position for rendering exposure possible. It depends entirely on he individual camera and shutter constructions, which of the solutions described is to be preferred.

The sensing member can be mechanical and act directly on the catches or traps holding the opening and, respectively, closing parts of the shutter. For cameras with electronically controlled shutters, which now are used predominantly, the sensing member preferably is of an electro-mechanic or electronic type with indirect shutter control.

The sensing member, depending on whether it is of mechanic, electro-mechanic or electronic type, is provided with a simple mechanic or electronic locking means adapted for the type in question, in order to render possible rapid film exchanges without requiring an extra cocking of the shutter.

The sensing member as well as its locking means can be designed in a simple and reliable manner and individually be adapted to the camera and focal plane shutter in question. Several solutions are possible within the scope of the invention idea.

Figure 1:
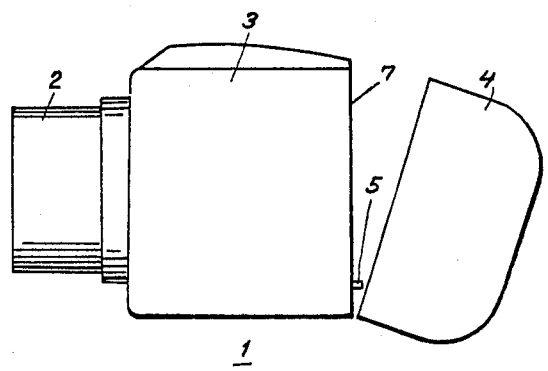

Some preferred non-restrictive embodiments of the invention are described in greater detail in the following, with reference to the accompanying drawings, in which FIG. 1 is a lateral view of a single-lens reflex camera with exchangeable film magazine partially removed/attached, FIG. 2 is a perspective front view of portions of a camera body where the invention is applied to a roller-blind shutter, FIGS. 3 and 4 are cross-sections of a mechanic locking means, and FIGS. 5 and 6 are sections through two different variants of the sensing member according to the invention.

A single-lens reflex camera 1, the main components of which are a lens 2, a camera body 3 and an exchangeable film magazine 4, is shown schematically in FIG. 1. The film magazine 4, which is attached detachably to the camera body 3 by mounting means (not shown) provided in the upper and lower edges of the film magazine 4 or camera body 3, is shown in FIG. 1 in a position, which the magazine assumes while being applied/removed. In the surface of the camera body facing toward the film magazine 4 a member in the form of an axially resilient pin 5 is provided which senses the position of the film magazine. When the film magazine 4 is removed from the camera body 3, the pin 5 springs out to the position shown in FIG. 1. Invertedly, when the film magazine 4 is attached to the camera body 3, the pin 5 is pressed inward to the camera body 3. The inward and, respectively, outward movement of the pin is utilized directly or indirectly for controlling the focal plane shutter in such a manner, that the opening part thereof opens when the film magazine 4 is removed, and that the closing part thereof closes when the film magazine 4 is attached to the camera. Hereby the opening and closing parts, which are sensitive to damage, are concealed and protected when the camera is opened, for example for film exchange. It is easily understood that the same device can be applied to cameras, which instead of a film magazine 4 have a removable or pivotal camera back.

FIG. 2 is a schematic perspective front view of a roller-blind shutter 6, which is provided with the pin 5 described in connection with FIG. 1. The rear surface 7 of the camera body is provided with a film gate 8 for limiting the picture size of the camera 1. On opposed sides of the gate 8, curtain shafts 9,10 are mounted in the camera body 3. Said shafts 9,10 are provided with stationary cord winding drums 11,12, between which curtain drums 13,14 are located. The opening part of the roller-blind shutter 6 consists of a first curtain 15 attached with one end to the curtain drum 14, and at the other end thereof cords 16 are provided and coupled to the upper and, respectively, lower cord winding drum 11. In a corresponding manner, the closing part of the roller-blind shutter 6, a second curtain 17, is attached to the curtain winding drum 13 and by associated cords 18 coupled to the cord winding drums 12. The lower rope winding drum 11 and the lower edge of the curtain drum 13 are provided with geared rings 19 and, respectively, 20, which mesh with ratchet wheels 21 and, respectively, 22. Resilient catches 23 and, respectively, 24 resting against the ratchet wheels 21 and 22 are controlled by solenoids 25 and, respectively, 26. For drawing the curtains 15,17 past the gate 8, the lower edge of the curtain drum 14 and the cord winding drum 12 are provided with geared rings (concealed in FIG. 2), which mesh with spring motors 27 and, respectively, 28. The roller-blind shutter 6 is equipped with an electronic unit 29, which in known manner is constructed of time circuits to emit control impulses to the solenoids 25,26 at a time interval corresponding to the shutter speed set on the camera 1. As this function can be carried out in several different ways, and the associated couplings do not directly concern the present invention, the electronic unit is not described here in greater detail nor are in FIG. 2 the setting means for the shutter speeds of the roller-blind shutter 6 and its connection to the electronic unit 29 shown, because these details are not important for understanding the present invention.

In FIG. 2 the resilient pin 5 is shown only schematically and it is assumed in this case to comprise a contact means, which via lines 30 close and, respectively, break the control circuit in the electronic circuit 29, which controls the solenoids 25, 26 via lines 31 and, respectively, 32.

When the camera 1 is closed, the pin 5 is impressed by the film magazine 4 when this abuts the rear surface 7 of the camera body 3. The contact means controlled by the pin 5 then does not actuate the electronic unit 29, which in closed state of the camera is used only for its functions related to exposure. When the camera is opened, for example for film exchange, the pin 5 springs out as shown in FIG. 1, whereby the contact means controlled by the pin 5 emits a control impulse to the electronic unit 29, which impulse releases the curtain 15 in that the solenoid 25 receives current and withdraws the catch 23 acting as armature from the ratchet wheel 21. The curtains 15,17 now are wound on the curtain drum 14 and, respectively, 13, which are located in protected position outside the gate 8 now being exposed. The curtains thereby, as desired, are not accessible to unintentional outside action. When the film magazine 4 again is attached to the camera body 3, the pin 5 is pressed inward by abutting the rear surface 7 of the camera body 3 and reassumed its original position. This results in a new control impulse from the contact means to the electronic unit 29 whereby the curtain 17 is released in that the solenoid 26 receives current and attracts the catch 24. The curtain 17 then covers the gate 8, and the roller-blind shutter 6 is fully released. The shutter, therefore, again must be cocked for the next exposure to take place.

When it is desired at urgent film exchange, for example at reportage photgraphy, to disconnect the aforesaid protective device for the curtains 15,17 in order not to lose time by an extra cocking of the shutter, this can be effected most simply by locking the pin 5 in its impressed position, for example as shown in FIGS. 3 and 4. In FIG. 3 the pin 5 is shown in its unlocked position, at which its head 34 with a screw slot 33 projects outside the rear surface 7 of the camera body 3 by action of a spring 35. A locking pin 36 extending through the pin 5 moves upon axial movement of the pin 5 in a long and narrow groove 37. The object of the locking pin 36 is to limit the movement of the pin 5 to the film magazine 4 so as to prevent it from dropping out, and after complete impression of the pin 5 and its turning through 90° by means of the slot 33 to lock the pin 5, in such a manner, that the locking pin 37 rests against an inner edge 48 to the side of the groove 37 (FIG. 4). The contact means (not shown), which is controlled by the pin 5, may consist, for example, of a contact spring actuated by the free end of the pin 5.

The member sensing the position of the film magazine 4 or camera back can be designed in several different ways, as appears from the examples of alternative solutions of the pin 5 design shown in FIGS. 5 and 6.

FIG. 5 shows a contact means, which is located in the camera body 3 and comprises a fixed contact portion 38 and a contact portion 40 movable about a stud 39. Said movable contact portion 40 is pressed against the contact portion 38 by action of a weak tension spring 41 when the film magazine 4 has been removed, whereby the contact 38,40 can conduct current. In the film magazine 4 a small permanent magnet 42 is attached directly in front of the free end of the contact 40. When the film magazine 4 has been attached to the camera body 3, the permanent magnet 42 attracts the movable contact portion 40 acting as armature, whereby the contact 38,40 is broken. The contact 38,40 thereby can be caused to control the electronic unit 29 in the same way as described in connection with FIG. 3. By blocking the movable contact portion 40 in broken position, for example by means of a pin (not shown) operated from the outside of the camera body 3, the desired locking effect can be obtained.

FIG. 6 shows an electro-optical member, which senses the position of the film magazine 4 in relation to the camera body 3. Two channels 43,44 are provided in one side of the camera body 3 in such a manner, that they form an angle, for example of 90°, with one another, and form equal angles, for example of 45°, with the rear surface 7 of the camera body 3, and that the openings of the channels 43,44 facing toward the film magazine 4 are tangent to each other. On the film magazine 4 a small mirror 45 is mounted directly in front of said openings of the channels 43,44. By means of a light source, for example a photo-diode 46 in the channel 43 and a light-sensitive member, for example a photocell 47, in the channel 44, light emitted from the photodiode 46 and reflected by the mirror 45 can be scanned by the photocell 47. When the camera 1 is opened by removing the film magazine 4, the mirror 45 is removed and thereby the connection between the photo-diode 46 and the photocell 47 is broken. This change is utilized to emit to the electronic unit 29 control signals analogous to what has been described above. The means can be locked electronically by simulating the effect of light in the circuit of the photocell 47.

It is easily understood that electronic locking of the sensing member can be effected in all cases where the focal plane shutter is controlled electro-mechanically or electronically, in which case, for example, an external switch is provided for breaking the control circuit controlling the opening part of the shutter. Alternatively the switch can be caused to short-circuit the solenoid, which releases the catch of the opening shutter part.

What we claim is:

1. A device for photographic cameras with focal plane shutter, characterized in that on the camera surface facing toward the film magazine, alternatively toward the camera back, a member for sensing the film magazine, alternatively the camera back, is provided which directly or indirectly is coupled to the focal plane shutter for releasing the opening part thereof when the film magazine is being removed, alternatively when the camera back is being opened or removed.

2. A device as defined in claim 1, characterized in that the sensing member in lockable in a position or state corresponded by the postion prevailing at attached film magazine, alternatively at closed camera back.

3. A device as defined in claim 1 or 2, characterized in that the sensing member is designed as an axially movable resilient pin.

4. A device as defined in claim 1 or 2, characterized in that the sensing member is designed as one fixed and one movable contact portion disposed in the camera body, which movable contact portion can be actuated by a permanent magnet located in the film magazine, alternatively in the camera back, for breaking the contact when the film magazine is attached, alternatively when the camera back is closed.

5. A device as defined in claim 1 or 2, characterized in that the sensing member is designed as a light source located in the camera body, a mirror disposed in the light path on the film magazine, alternatively on the camera back, and a photocell located in the camera body and reacting on light reflected from the mirror.

6. A device as defined in any one of the claims 1, 2 or 3, characterized in that the pin is lockable in a position inserted and turned through 90° by means of a locking pin extending in a long and narrow groove in the inside of the camera body.

7. A device as defined in any one of the claims 1, 2, or 4, characterized in that the movable contact portion is lockable in broken connection by means of a pin actuated from the outside of the camera body.

8. A device as defined in any one of the claims 1, 2 or 5, characterized in that the sensing member is lockable electronically by means of a signal applied, which simulates the signal emitted by the lightened photocell.

9. A device as defined in claim 1 or 2, characterized in that it comprises an electric locking means consisting of a switch located on the outside of the camera box for breaking the control circuits of the focal plane shutter.

10. A device as defined in claim 1 or 2, characterized in that it comprises an electric locking means consisting of a switch located on the outside of the camera box for short-circuiting the releasing solenoids of the focal plane shutter.

* * * * *